(12) United States Patent
Hayashi et al.

(10) Patent No.: US 11,403,865 B2
(45) Date of Patent: *Aug. 2, 2022

(54) NUMBER-OF-OCCUPANTS DETECTION SYSTEM, NUMBER-OF-OCCUPANTS DETECTION METHOD, AND PROGRAM

(71) Applicants: NEC CORPORATION, Tokyo (JP); NEC Solution Innovators, Ltd., Tokyo (JP)

(72) Inventors: Haruyuki Hayashi, Tokyo (JP); Michihiko Yusa, Tokyo (JP); Noboru Nakajima, Tokyo (JP)

(73) Assignees: NEC CORPORATION, Tokyo (JP); NEC Solution Innovators, Ltd., Tokyo (JP)

( * ) Notice: Subject to any disclaimer, the term of this patent is extended or adjusted under 35 U.S.C. 154(b) by 255 days.

This patent is subject to a terminal disclaimer.

(21) Appl. No.: 16/633,020

(22) PCT Filed: Oct. 26, 2017

(86) PCT No.: PCT/JP2017/038640
§ 371 (c)(1),
(2) Date: Jan. 22, 2020

(87) PCT Pub. No.: WO2019/021500
PCT Pub. Date: Jan. 31, 2019

(65) Prior Publication Data
US 2020/0250411 A1    Aug. 6, 2020

(30) Foreign Application Priority Data
Jul. 25, 2017 (JP) .............................. JP2017-143923

(51) Int. Cl.
*B60R 11/04* (2006.01)
*G06V 40/10* (2022.01)
(Continued)

(52) U.S. Cl.
CPC .............. *G06V 40/10* (2022.01); *B60R 11/04* (2013.01); *B60W 30/12* (2013.01); *G06T 5/003* (2013.01);
(Continued)

(58) Field of Classification Search
CPC ............ G06K 9/00362; G06K 9/00825; B60R 11/04; B60R 2300/8006; B60W 30/12;
(Continued)

(56) References Cited

U.S. PATENT DOCUMENTS 7,769,513 B2    8/2010    Breed et al.
10,217,363 B2 *  2/2019    Wang ...................... G01S 19/42
(Continued)

FOREIGN PATENT DOCUMENTS

JP    2005-186878 A    7/2005
WO    2014/061195 A1    4/2014
(Continued)

OTHER PUBLICATIONS

International Search Report for PCT/JP2017/038640 dated Jan. 16, 2018 [PCT/ISA/210].
(Continued)

*Primary Examiner* — Shaghayegh Azima
(74) *Attorney, Agent, or Firm* — Sughrue Mion, PLLC

(57) ABSTRACT

A number-of-occupants detection system (1) is configured to include an image acquisition unit (110) that acquires, from an imaging apparatus mounted on a first vehicle, an image of a second vehicle existing around the first vehicle and a count unit (120) that counts the number of occupants of the second vehicle using the image acquired by the image acquisition unit (110).

15 Claims, 15 Drawing Sheets

(51) Int. Cl.
*G06T 7/73* (2017.01)
*B60W 30/12* (2020.01)
*G06T 5/00* (2006.01)
*G06V 20/58* (2022.01)

(52) U.S. Cl.
CPC .............. *G06T 7/74* (2017.01); *G06V 20/584* (2022.01); *B60R 2300/8006* (2013.01); *G06T 2207/30196* (2013.01); *G06T 2207/30242* (2013.01); *G06T 2207/30252* (2013.01)

(58) Field of Classification Search
CPC . G06T 7/74; G06T 5/007; G06T 2207/30196; G06T 2207/30242; G06T 2207/30252
See application file for complete search history.

(56) References Cited

U.S. PATENT DOCUMENTS

| | | | | |
|---|---|---|---|---|
| 10,318,829 | B2* | 6/2019 | Miyamoto | G06T 7/50 |
| 10,589,679 | B1* | 3/2020 | Askeland | G06F 3/1431 |
| 10,853,882 | B1* | 12/2020 | Leise | G06V 20/46 |
| 11,180,139 | B2* | 11/2021 | Katayama | B62D 15/025 |
| 2012/0027255 | A1* | 2/2012 | Endo | G06V 20/588 |
| | | | | 382/103 |
| 2012/0262577 | A1* | 10/2012 | Wang | G06T 7/11 |
| | | | | 348/148 |
| 2012/0296522 | A1* | 11/2012 | Otuka | B60W 30/12 |
| | | | | 701/41 |
| 2013/0141574 | A1* | 6/2013 | Dalal | H04N 5/33 |
| | | | | 348/148 |
| 2015/0278617 | A1* | 10/2015 | Oami | G06V 20/593 |
| | | | | 382/103 |
| 2015/0294144 | A1* | 10/2015 | Konishi | G06V 40/166 |
| | | | | 382/103 |
| 2016/0173748 | A1* | 6/2016 | Oba | H04N 5/217 |
| | | | | 348/148 |
| 2016/0176341 | A1* | 6/2016 | Raghu | B60W 30/18163 |
| | | | | 348/148 |
| 2016/0239714 | A1* | 8/2016 | Oami | G06V 20/59 |
| 2016/0347251 | A1* | 12/2016 | Shigemura | B60R 1/00 |
| 2017/0053533 | A1* | 2/2017 | Kuroda | B62D 15/021 |
| 2017/0091566 | A1* | 3/2017 | Kasaoki | H04N 5/2355 |
| 2018/0022278 | A1* | 1/2018 | Parat | B60R 1/00 |
| | | | | 348/148 |
| 2018/0157922 | A1* | 6/2018 | Miyamoto | G06K 9/624 |
| 2018/0194365 | A1* | 7/2018 | Bae | B60W 10/20 |
| 2018/0300898 | A1* | 10/2018 | Eshima | G01C 21/005 |
| 2018/0308364 | A1* | 10/2018 | Kume | G06V 20/58 |
| 2019/0263262 | A1* | 8/2019 | Mimura | B60W 10/18 |
| 2021/0357684 | A1* | 11/2021 | Amirghodsi | G06K 9/6215 |
| 2021/0362689 | A1* | 11/2021 | Ichikawa | H04N 5/2171 |
| 2021/0364280 | A1* | 11/2021 | Miki | G01S 17/931 |

FOREIGN PATENT DOCUMENTS

| | | | | |
|---|---|---|---|---|
| WO | WO-2014061195 A1 * | 4/2014 | ......... | G06K 9/00255 |
| WO | 2014/064898 A1 | 5/2014 | | |

OTHER PUBLICATIONS

Indian Office Action for IN Application No. 202017002844 dated Jul. 13, 2021.

* cited by examiner

FIG. 8

| VEHICLE NUMBER | NUMBER OF OCCUPANTS |
|---|---|
| XXX-XXXX | 5 |
| YYY-YYYY | 7 |
| ★ ZZZ-ZZZZ | 1 |

| CAPTURING TARGET | SETTING AT TIME OF CAPTURING |
|---|---|
| PARALLEL RUNNING VEHICLE | • FRAME RATE : LOW<br>• SHUTTER SPEED : LOW<br>• AMOUNT OF LIGHT : NORMAL |
| ONCOMING VEHICLE | • FRAME RATE : HIGH<br>• SHUTTER SPEED : HIGH<br>• AMOUNT OF LIGHT : LARGE |

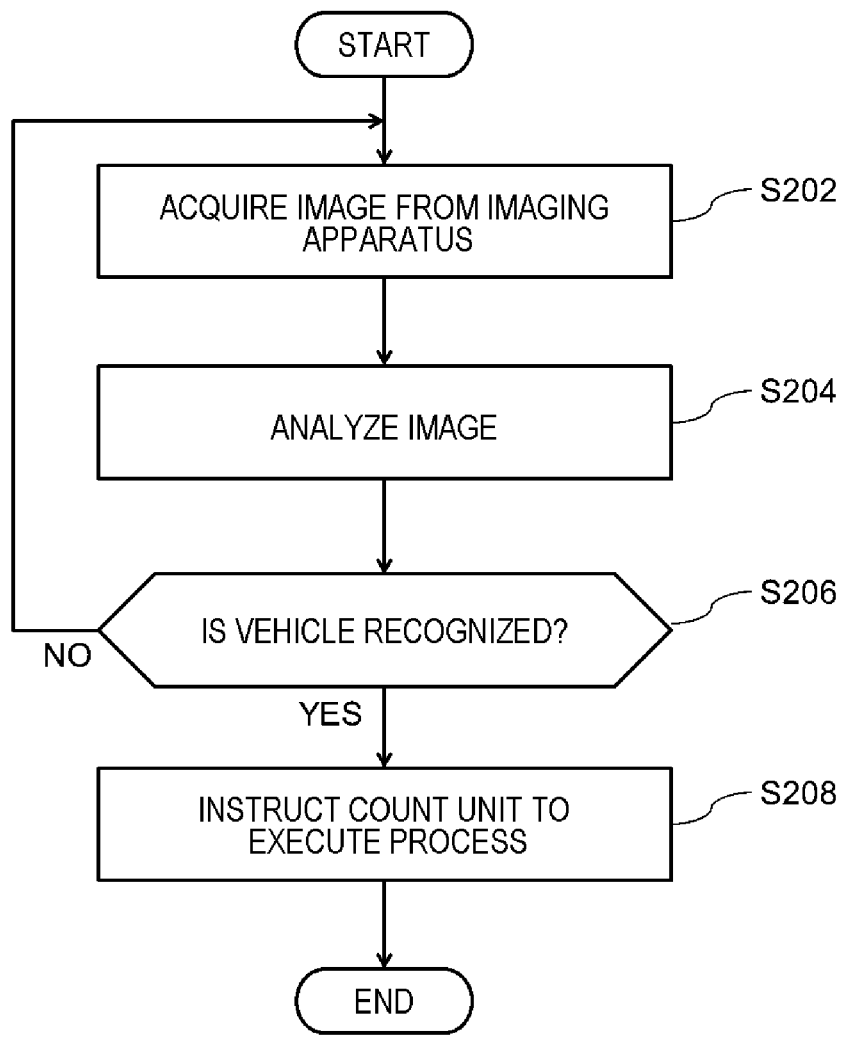

NUMBER-OF-OCCUPANTS DETECTION SYSTEM, NUMBER-OF-OCCUPANTS DETECTION METHOD, AND PROGRAM

CROSS REFERENCE TO RELATED APPLICATIONS

This application is a National Stage of International Application No. PCT/JP2017/038640 filed Oct. 26, 2017, claiming priority based on Japanese Patent Application No. 2017-143923 filed Jul. 25, 2017, the disclosure of which is incorporated herein in its entirety by reference.

TECHNICAL FIELD

The present invention relates to a technique for recognizing the number of occupants in a vehicle.

BACKGROUND ART

There is a need to recognize the number of occupants in the vehicle. For example, in Europe and the United States, there is a dedicated lane where a vehicle with more than a certain number of occupants is preferentially treated, such as high-occupancy vehicle (HOV) lane and high-occupancy toll (HOT) lane, and there is a need to recognize the number of occupants of the vehicle traveling on such a lane.

For the need described above, for example, there are techniques described in the following patent documents. In the following Patent Document 1 and Patent Document 2, the technique for detecting the number of occupants of a vehicle by acquiring an image including the vehicle as a subject by an imaging apparatus installed on a side of a road and analyzing the image is disclosed.

RELATED DOCUMENT

Patent Document

[Patent Document 1] Pamphlet of International Publication No. WO2014/064898
[Patent Document 2] Pamphlet of International Publication No. WO2014/061195

SUMMARY OF THE INVENTION

Technical Problem

In the conventional system, in order to detect the number of occupants of the vehicle traveling on the road, an imaging apparatus is fixedly installed at a certain place. In this case, a range in which the number of occupants in the vehicle can be detected is limited to an imaging range of the imaging apparatus that is fixedly installed. Therefore, there is a problem that the number of occupants cannot be detected for a vehicle that travels away from a place where such an imaging apparatus is installed.

The present invention has been made in view of the problems described above. One of the objects of the present invention is to provide a technique that enables detection of the number of occupants of a vehicle traveling on a road regardless of a place.

Solution to Problem

According to the present invention, there is provided a number-of-occupants detection system including an image acquisition unit that acquires, from an imaging apparatus mounted on a first vehicle, an image of a second vehicle existing around the first vehicle, and a count unit that counts the number of occupants of the second vehicle using the image acquired by the image acquisition unit.

According to the present invention, there is provided a number-of-occupants detection method implemented by a computer including, acquiring, from an imaging apparatus mounted a first vehicle, an image of a second vehicle existing around the first vehicle, and counting the number of occupants of the second vehicle using the acquired image.

According to the present invention, there is provided a program for causing a computer to execute the number-of-occupants detection method mentioned above.

Advantageous Effects of Invention

According to the present invention, it becomes possible to detect the number of occupants of a vehicle traveling on a road regardless of a place.

BRIEF DESCRIPTION OF THE DRAWINGS

The object described above and other objects, features, and advantages will be further clarified by preferred example embodiments described below and the following drawings attached thereto.

FIG. 8 is a diagram illustrating an example of a screen for outputting a processing result of a count unit.

FIG. 11 is a diagram illustrating an example of a configuration for storing setting information of the imaging apparatus.

FIG. 15 is a flowchart illustrating a flow of processing in the number-of-occupants detection system of the sixth example embodiment.

DESCRIPTION OF EMBODIMENTS

Hereinafter, embodiments of the present invention will be described with reference to the drawings. Note that in all of the drawings, the same constituents will be designated by the same reference signs, and descriptions of such constituents will not be repeated. In addition, in each block diagram, unless otherwise particularly described, each block does not represent a hardware unit configuration and represents a function unit configuration.

First Example Embodiment

[Function Configuration]

Figure 1:
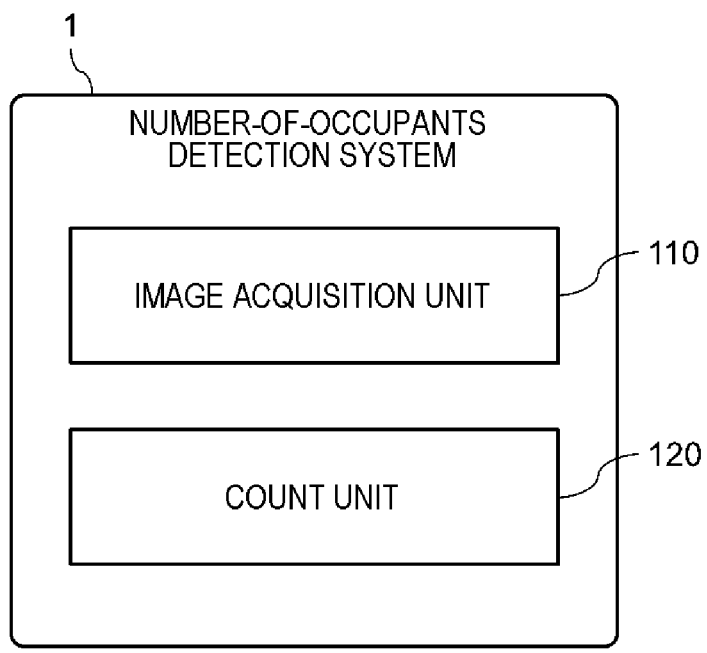
FIG. 1 is a block diagram conceptually illustrating a functional configuration of a number-of-occupants detection system according to a first example embodiment.

FIG. 1 is a block diagram conceptually illustrating a functional configuration of a number-of-occupants detection system 1 of a first example embodiment. As illustrated in FIG. 1, the number-of-occupants detection system 1 is configured to include an image acquisition unit 110 and a count unit 120.

The image acquisition unit 110 acquires, for example, from an imaging apparatus mounted on a patrol vehicle (hereinafter also referred to as "first vehicle" (not illustrated)) operated by a person in charge, an image of another vehicle (a vehicle that travels parallel to or facing the first vehicle on the road on which the first vehicle travels, and hereinafter also referred to as "second vehicle" (not illustrated)) existing around the first vehicle. The count unit 120 counts the number of occupants in the second vehicle using an image acquired by the image acquisition unit 110. The count unit 120 can count the number of occupants of the second vehicle based on an image including the second vehicle as a subject, for example, using the technique disclosed in Patent Document 1 or Patent Document 2 described above.

As described above, in this example embodiment, the first vehicle has an imaging apparatus for imaging an image used in a number-of-occupants count process. According to this configuration, as the first vehicle moves, an imaging range of the imaging apparatus also moves. With this configuration, if there exists a place where the vehicle can travel, the number of occupants of the second vehicle can be detected regardless of the place. Conventionally, a fixed imaging apparatus should be installed at each of a plurality of surveillance points. On the other hand, according to the number-of-occupants detection system 1, it is also possible to cover at least two or more surveillance points with the imaging apparatus mounted on the first vehicle. Thus, compared to the conventional case, the effect of reducing the introduction cost of a system required when the same area is set as a surveillance target can be expected.

Hereinafter, the first example embodiment will be described in more detail.

[Hardware Configuration]

Each functional configuration unit of the number-of-occupants detection system 1 may be implemented by hardware (for example, a hard-wired electronic circuit) that implementing each functional configuration unit, or may be implemented by a combination of hardware and software (for example, combination of an electronic circuit and a program controlling the electronic circuit). Hereinafter, a case where each functional configuration unit of the number-of-occupants detection system 1 is implemented by the combination of hardware and software will be further described.

Figure 2:
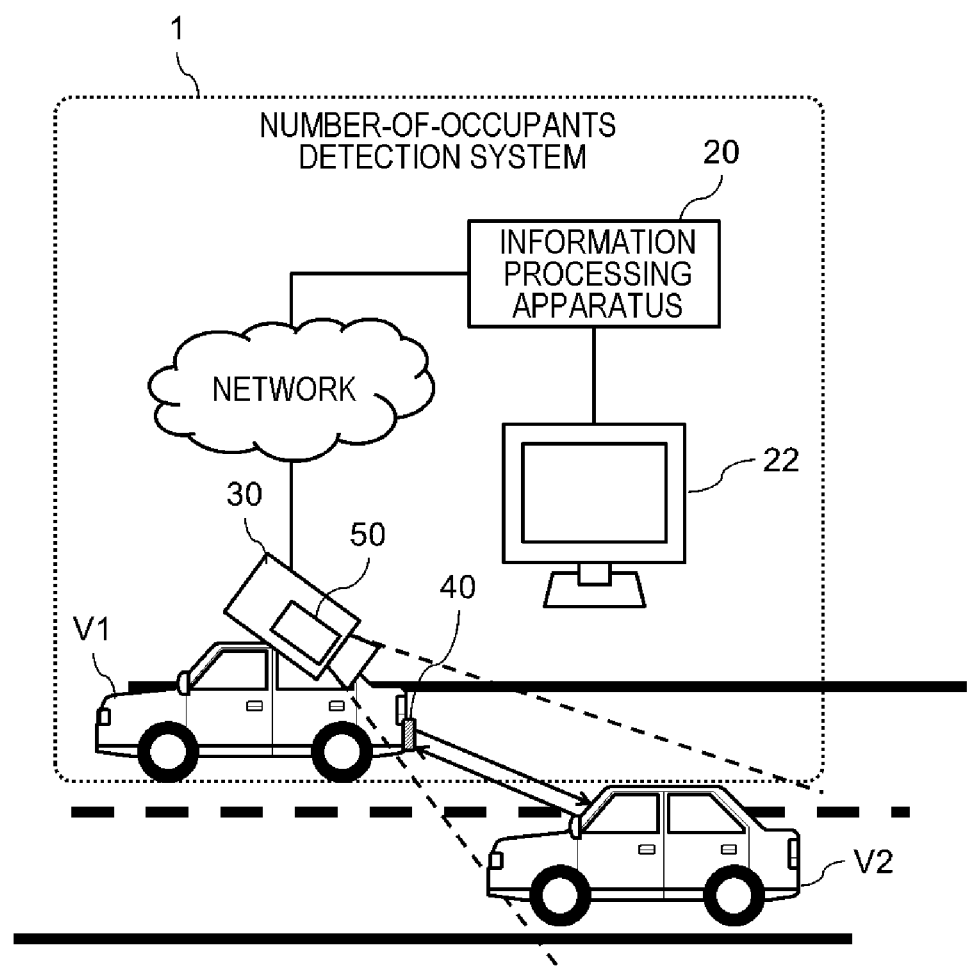
FIG. 2 is a diagram conceptually illustrating a system configuration of the number-of-occupants detection system.

FIG. 2 is a diagram conceptually illustrating a system configuration of the number-of-occupants detection system 1. As illustrated in FIG. 2, the number-of-occupants detection system 1 is configured to include an information processing apparatus 20, an imaging apparatus 30, a vehicle detection sensor 40, and a projector 50. The information processing apparatus 20 is connected to a display apparatus 22 for displaying the result of counting the number of occupants by the count unit 120.

The imaging apparatus 30 is mounted on the first vehicle V1, and is connected to the information processing apparatus 20 via a network. Although not illustrated, a plurality of imaging apparatuses 30 may be mounted on the first vehicle V1. For example, a first imaging apparatus used when a second vehicle V2 is a parallel travelling vehicle (when the first vehicle V1 and the second vehicle V2 are traveling in the same direction) and a second imaging apparatus used when the second vehicle V2 is an oncoming vehicle (when the first vehicle V1 and the second vehicle V2 are traveling in opposite directions) may be mounted on the first vehicle V1. The first imaging apparatus is installed, for example, diagonally rearward or sideways with respect to the first vehicle V1 so as to capture feature portions (eyes, nose, mouth, and the like) of the occupant's face of the second vehicle V2 travelling in parallel with the first vehicle V1. In the case of an oncoming vehicle, the time required for passing each other is shorter than in the case of a parallel travelling vehicle, and thus the second imaging apparatus is installed, for example, diagonally forward (diagonally left forward if right-hand traffic).

As described above, the imaging apparatus 30 may be installed diagonally (imaging apparatus 30 for a parallel travelling vehicle is diagonally rearward and imaging apparatus 30 for an oncoming vehicle is diagonally forward). By installing the imaging apparatus 30 diagonally, the second vehicle V2 that travels parallel to or facing the first vehicle V1 is captured at different angles depending on a positional relationship with the first vehicle V1. By installing the imaging apparatus 30 diagonally forward or rearward, it is possible to capture, from diagonally forward, the second vehicle V2 that travels parallel to or facing the first vehicle V1. With this configuration, it is possible to obtain an image in which a plurality of occupants in the image are less overlapped and the faces of the plurality of occupants are well captured.

Figure 3:
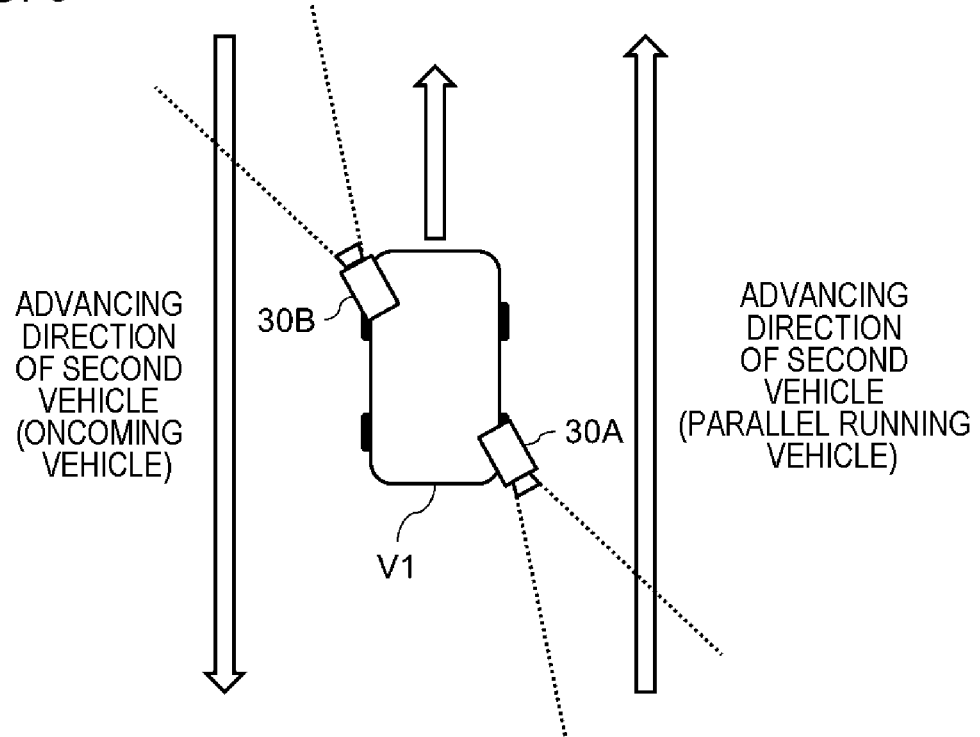
FIG. 3 is a diagram illustrating an installation example of a first imaging apparatus and a second imaging apparatus.

An installation example of the first imaging apparatus and the second imaging apparatus will be described with reference to FIG. 3. In FIG. 3, a reference numeral 30A indicates the first imaging apparatus, and a reference numeral 30B indicates the second imaging apparatus. Note that, FIG. 3 illustrates a right-hand traffic case.

In the example of FIG. 3, the first imaging apparatus 30A is installed looking toward diagonally backward right of the first vehicle V1. The first imaging apparatus 30A is installed toward a direction (backward of the vehicle) opposite to an advancing direction $d_{v1}$ of the first vehicle V1 in order to capture a parallel travelling vehicle being directed toward the same direction from the front. Note that, although not illustrated, a plurality of first imaging apparatuses 30A may be provided. For example, the first imaging apparatus 30A that is installed looking toward the right direction or diagonally backward right of the first vehicle V1 and another first imaging apparatus 30A that is installed looking toward the left direction or diagonally backward left of the first vehicle V1 may be provided in the first vehicle V1. In this case, the first imaging apparatus 30A that is installed looking toward the right direction or diagonally backward right of the first vehicle V1 is used for imaging a vehicle travelling in parallel on the right lane of the first vehicle V1. Another first imaging apparatus 30A installed looking toward the left direction or diagonally backward left of the first vehicle V1 is used for imaging a vehicle travelling in parallel on the left lane of the first vehicle V1. In addition, four first imaging apparatuses 30A directed toward the left-and-right direction and diagonally backward left and right may be provided.

In the example of FIG. 3, the second imaging apparatus 30B is installed diagonally forward left with respect to the first vehicle V1. The second imaging apparatus 30B is installed looking toward the advancing direction $d_{v1}$ (forward of the vehicle) of the first vehicle V1 in order to capture the oncoming vehicle approaching and facing from the front. In other words, a imaging direction of the second imaging apparatus 30B is directed closer toward the advancing direction $d_{v1}$ of the first vehicle than the imaging direction of the first imaging apparatus 30A. Note that, in an area where the left-hand traffic is adopted, since the oncoming vehicle exists on the right side, the second imaging apparatus 30B is installed diagonally forward right.

The relative velocity with respect to the first vehicle V1 varies greatly between when the second vehicle V2 is a parallel travelling vehicle and when the second vehicle V2 is an oncoming vehicle. Therefore, a preferable setting value also changes for the setting of the imaging apparatus 30 when imaging an image. By providing the first imaging apparatus used when imaging a parallel travelling vehicle and the second imaging apparatus used when imaging an oncoming vehicle, respectively, an image that can be used for the count processing can be captured regardless of the advancing direction of the second vehicle V2. In this case, the image acquisition unit 110 acquires a first image generated by the first imaging apparatus and a second image generated by the second imaging apparatus as different images imaging the different second vehicles V2. The count unit 120 can independently execute processing of counting the number of occupants of the second vehicle V2 travelling in parallel using the first image and processing of counting the number of occupants of the second vehicle V2 travelling facing each other using the second image.

The vehicle detection sensor 40 is used as a sensor for detecting the second vehicle V2 existing around the first vehicle V1. The vehicle detection sensor 40 is, for example, a millimeter wave radar, light detection and ranging (LIDAR), sonar, and the like. The vehicle detection sensor 40 is used as a distance measurement unit that measures the distance (and direction) from the first vehicle V1 to the second vehicle V2. The imaging apparatus 30 can measure the timing of imaging an image of the second vehicle V2 based on the distance from the first vehicle V1 to the second vehicle V2 measured by the vehicle detection sensor 40. Note that, the vehicle detection sensor 40 may be provided separately from the imaging apparatus 30, or may be incorporated in the imaging apparatus 30.

The projector 50 is provided to clearly capture a person in the vehicle. Note that, the projector 50 may be provided separately from the imaging apparatus 30 or may be incorporated in the imaging apparatus 30. The projector 50 irradiates light (for example, near infrared rays) onto second vehicle V2, which is the subject, in conjunction with the imaging timing of the imaging apparatus 30.

Figure 4:
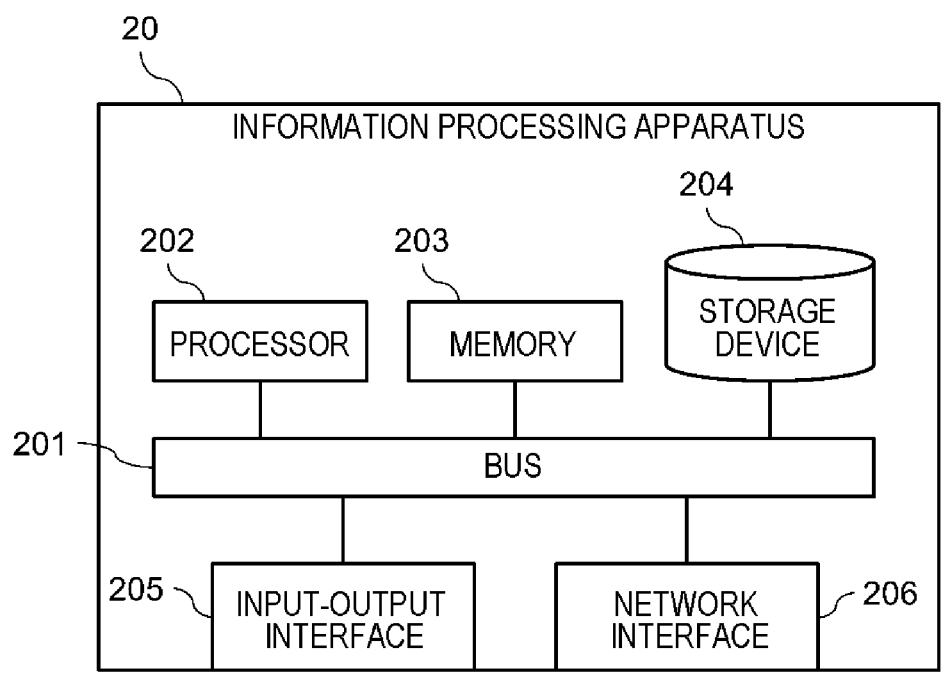
FIG. 4 is a block diagram conceptually illustrating a hardware configuration of an information processing apparatus.

FIG. 4 is a block diagram conceptually illustrating a hardware configuration of the information processing apparatus 20. The information processing apparatus 20 is configured to include a bus 201, a processor 202, a memory 203, a storage device 204, an input-output interface 205, and a network interface 206.

The bus 201 is a data transfer path for transmission and reception of data among the processor 202, the memory 203, the storage device 204, the input-output interface 205, and the network interface 206. A method of connecting the processor 202, the memory 203, the storage device 204, the input-output interface 205, the network interface 206, and the like to each other is not limited to bus connection.

The processor 202 is a processor such as a central processing unit (CPU) or a graphics processing unit (GPU). The memory 203 is a main storage apparatus that is implemented using a random access memory (RAM), a read only memory (ROM), or the like. The storage device 204 is an auxiliary storage apparatus that is implemented using a hard disk drive (HDD), a solid state drive (SSD), a memory card, or the like.

The storage device 204 stores a program module that implements the image acquisition unit 110 and the count unit 120, and a program module that implements a function of acquiring an image generated by the imaging apparatus 30. The processor 202 implements a function corresponding to each program module by reading each of the program modules into the memory 203 and executing the program module.

The input-output interface 205 is an interface for connecting the information processing apparatus 20 and peripheral apparatuses. For example, a display output device (display apparatus 22) such as a liquid crystal display (LCD) or a cathode ray tube (CRT) display, an input device such as a keyboard or a mouse, or a touch panel integrated with these components can be connected to the information processing apparatus 20 via the input-output interface 205.

The network interface 206 is an interface for connecting the information processing apparatus 20 to various networks such as a local area network (LAN) and a wide area network (WAN). As illustrated in FIG. 4, the information processing apparatus 20 can communicate with the imaging apparatus 30 and other terminals (not illustrated) by connecting to the network via the network interface 206. For example, the information processing apparatus 20 can communicate with the imaging apparatus 30 via the network interface 206 and acquire an image generated by the imaging apparatus 30. The information processing apparatus 20 can acquire the distance from the first vehicle V1 to the second vehicle V2 measured by the vehicle detection sensor 40 by communicating with the first vehicle V1 via the network interface 206. Note that, a method of connecting the information processing apparatus 20 to various networks may be a wireless connection or a wired connection.

Note that, FIGS. 2 and 4 are merely examples, and the hardware configuration of the present invention is not limited to the examples of FIGS. 2 and 4. For example, the information processing apparatus 20 and the imaging apparatus 30 may be integrated and mounted on the first vehicle V1. For example, the information processing apparatus 20 may be mounted on the first vehicle V1 together with the imaging apparatus 30. In this case, the image acquisition unit 110 and the count unit 120 are provided in the first vehicle. In this case, the count result of the number of occupants of the second vehicle V2 by the count unit 120 can be transmitted to a terminal (not illustrated) for a person in charge connected via the network interface 206, for example. In addition, the count result of the number of occupants of the second vehicle V2 by the count unit 120 may be output, for example, via an output device (not illustrated, such as a car navigation apparatus or a portable terminal) connected to the first vehicle.

Operation Example

Figure 5:
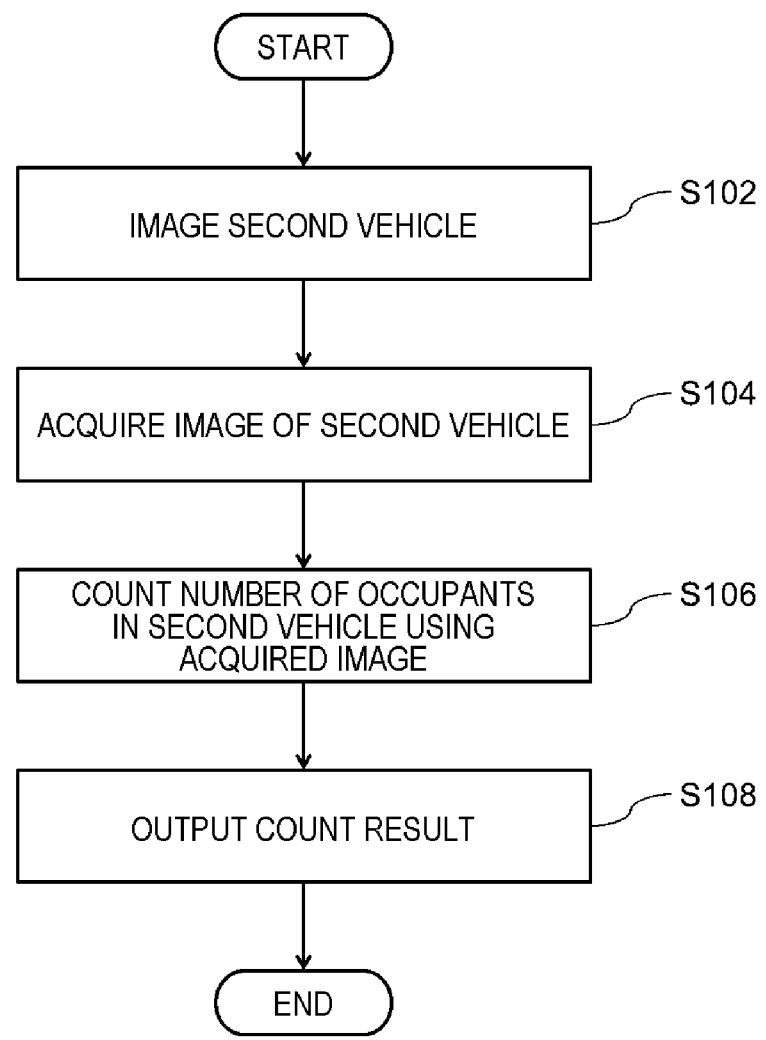
FIG. 5 is a flowchart illustrating an example of a flow of processing in the number-of-occupants detection system of the first example embodiment.

A flow of processing in the number-of-occupants detection system 1 of the first example embodiment will be described with reference to FIG. 5. FIG. 5 is a flowchart illustrating the flow of the processing in the number-of-occupants detection system 1 of the first example embodiment.

First, an image of the second vehicle V2 existing around the first vehicle V1 is generated by the imaging apparatus 30 mounted on the first vehicle V1 (S102). The imaging apparatus 30 generates the image of the second vehicle as follows, for example. First, the imaging apparatus 30 acquires an output signal of the vehicle detection sensor 40 as information indicating the distance from the first vehicle V1 to the second vehicle V2. The imaging apparatus 30 compares the distance indicated by the output signal of the vehicle detection sensor 40 with a threshold value stored in advance in, for example, a memory of the imaging apparatus 30, and images the second vehicle V2 at a timing when the distance indicated by the output signal of the vehicle detection sensor 40 becomes equal to or less than the threshold value. In addition, a switch for remotely controlling a imaging operation is provided in the first vehicle V1 instead of the vehicle detection sensor 40, and the imaging apparatus 30 may be configured to start the imaging operation in response to the occupant of the first vehicle V1 pressing the switch.

The image of the second vehicle V2 generated by the imaging apparatus 30 is acquired by the image acquisition unit 110 via the network interface 206 (S104). The image acquisition unit 110 transfers the image of the second vehicle V2 acquired from the imaging apparatus 30 to the count unit 120. Then, the count unit 120 counts the number of occupants in the second vehicle V2 using the image of the second vehicle V2 acquired by the image acquisition unit 110 (S106). For example, the count unit 120 can assign different labels (information for identifying each region) to a region (for example, a human face region) estimated as a human that can be extracted from the acquired image, and compute the number of the assigned labels as the number of occupants of the second vehicle V2. Note that, the count unit 120 can estimate a person's region using a technique such as template matching or machine learning (or deep learning) such as support vector machine (SVM) or convolutional neural network (CNN).

Figure 6:
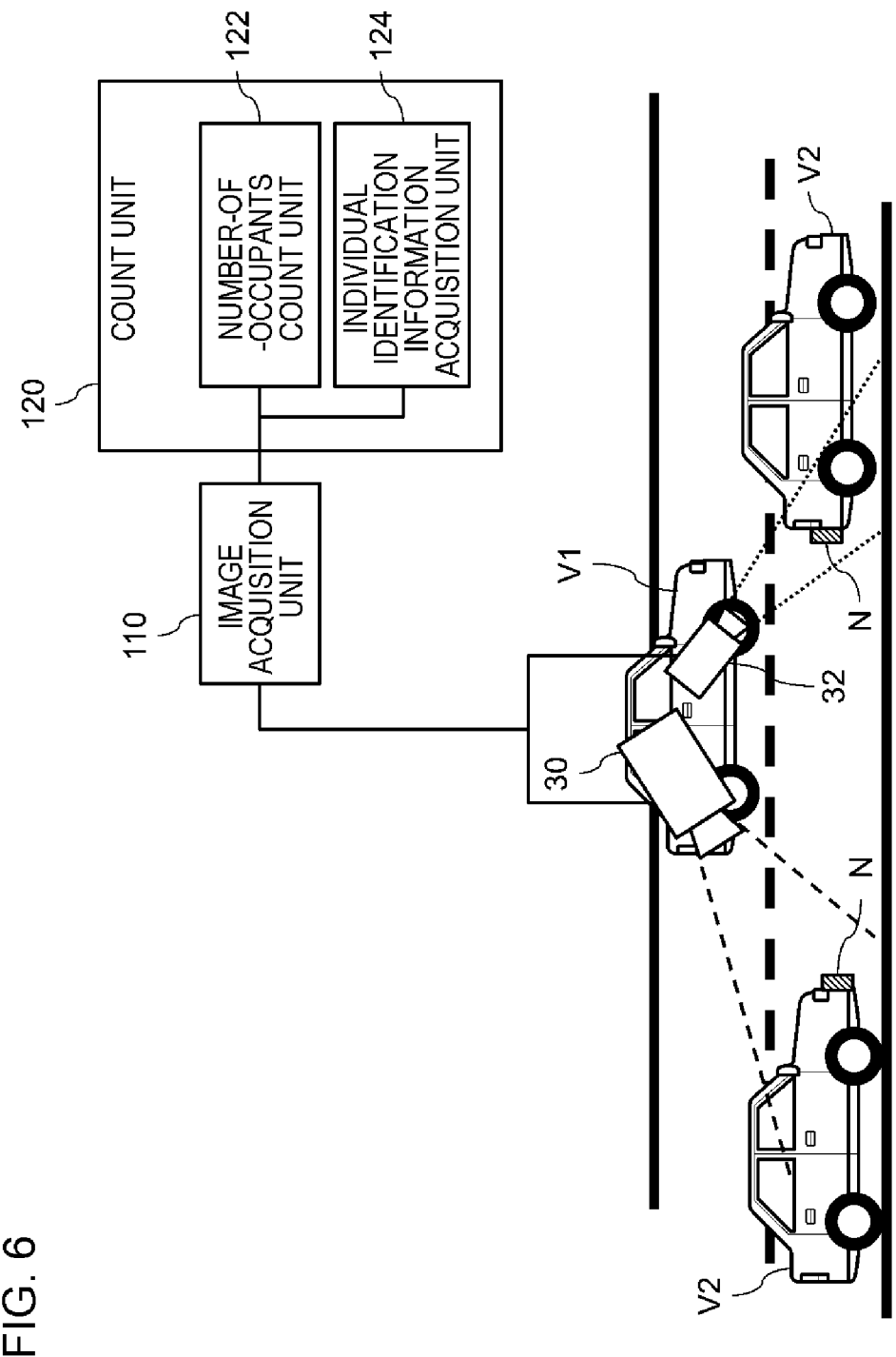
FIG. 6 is a block diagram illustrating an example of a configuration that enables acquisition of individual identification information of a second vehicle V2.

Note that, in order to recognize which vehicle the number of occupants counted in S106 is related to, for example, as illustrated in FIG. 6, a configuration for acquiring and associating information for identifying the individual second vehicles V2 may be further provided.

FIG. 6 is a block diagram illustrating an example of a configuration that enables acquisition of individual identification information of the second vehicle V2. In FIG. 6, in addition to the imaging apparatus 30 that generates an image that is used to count the number of occupants of the second vehicle V2, another imaging apparatus 32 that generates an image used for acquiring the individual identification information of the second vehicle V2 is mounted on the first vehicle V1. An example of the individual identification information of the second vehicle include, for example, characters or symbols written on a license plate N of the vehicle. Another imaging apparatus 32 is mounted on the first vehicle V1 with its position and orientation adjusted so that the license plate N of the vehicle can be imaged. Specifically, since the license plate is attached to a region below the imaging range (a region in which the occupant of the second vehicle is captured) of the imaging apparatus 30 in front of or rear of each vehicle, another imaging apparatus 32 is installed in a downward direction in front of or rear of the first vehicle V1. Note that, since some countries do not impose an obligation to attach the license plate to the front of the vehicle, as illustrated in FIG. 6, when another imaging apparatus 32 is provided only on the front side of the first vehicle, there is a possibility that the license plate of the oncoming vehicle cannot be imaged. Thus, in order to capture an image including the license plate of the oncoming vehicle, one imaging apparatus 32 directed toward a diagonal lower rear side (diagonal lower left side of the first vehicle V1 in the case where the right-hand traffic is adopted) of the first vehicle V1 may be installed (FIG. 7).

Figure 7:
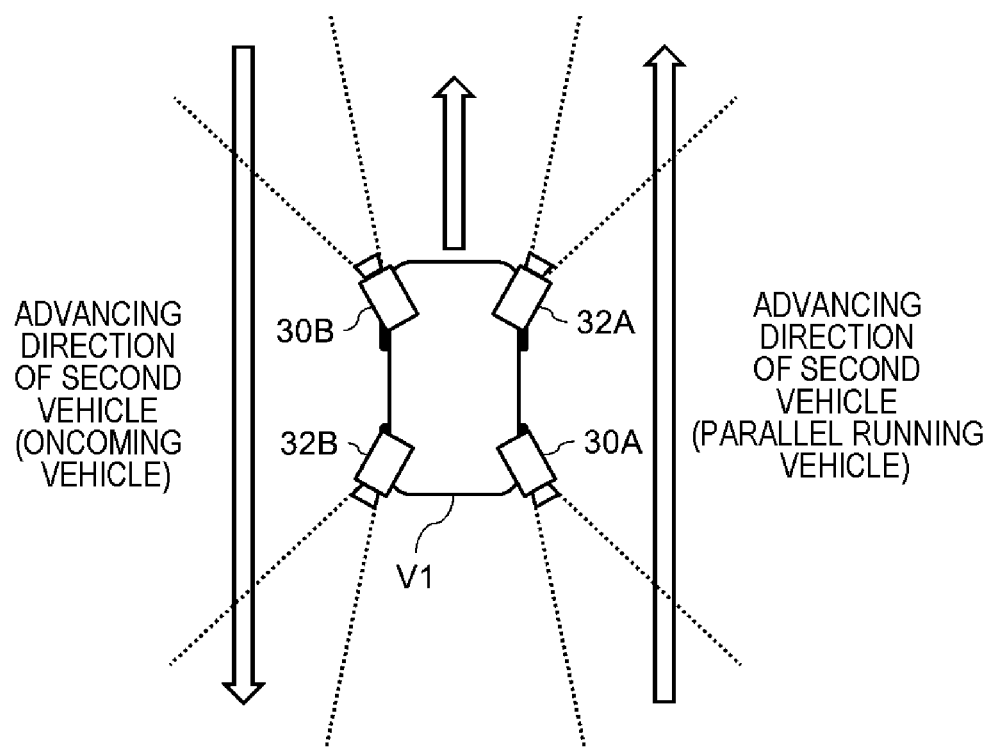
FIG. 7 is a diagram illustrating an installation example of another imaging apparatus.

FIG. 7 is a diagram illustrating an installation example of another imaging apparatus. In FIG. 7, an example is illustrated in which, in addition to the imaging apparatus 30, another imaging apparatus 32A for imaging the license plate of a vehicle travelling in parallel with the first vehicle V1 and another imaging apparatus 32B for imaging the license plate of a vehicle traveling facing the first vehicle V1 are installed in the first vehicle V1. Hereinafter, when another imaging apparatus 32A and another imaging apparatus 32B are not particularly distinguished, the imaging apparatuses 32A and 32B are also simply referred to as other imaging apparatuses 32. The imaging direction and imaging timing of another imaging apparatus 32 are different from those of the imaging apparatus 30. For example, unlike the imaging apparatus 30A, another imaging apparatus 32A for the parallel travelling vehicle is installed looking diagonally forward right. In a case of imaging the occupant of the second vehicle V2 when the first vehicle V1 overtakes the second vehicle V2, another imaging apparatus 32A for the parallel travelling vehicle captures the license plate attached to the rear of the second vehicle V2 before imaging by the imaging apparatus 30A (before approaching the second vehicle V2 to some extent). Another imaging apparatus 32B for the oncoming vehicle is installed, for example, looking diagonally backward left, unlike the imaging apparatus 30B. Another imaging apparatus 32B for the oncoming vehicle captures the license plate attached to the rear of the second vehicle V2 after imaging by the imaging apparatus 30B is performed (after passing by the second vehicle V2). Another imaging apparatus 32 may be configured to automatically perform imaging according to the distance indicated by the output signal of the vehicle detection sensor 40, or to perform imaging in response to a pressing operation of a switch mounted on the first vehicle.

Note that, in an area where the duty of wearing a license plate is imposed in front of the vehicle, the imaging apparatus 30 can also generate an image for acquiring individual identification information such as a license plate together with an image for counting the number of occupants in the second vehicle V2. For example, in the example of FIG. 6, since the license plate N is also attached to the front of the vehicle, it is possible to generate an image in which the license plate is captured using the imaging apparatus 30. In this case, another imaging apparatus 32 in FIG. 6 is not necessary.

In the example of FIG. 6, the count unit 120 includes a number-of-occupants count unit 122 that executes a number-of-occupants count process, and an individual identification information acquisition unit 124 that acquires individual identification information (for example, a character string of a license plate). When the images generated by the imaging apparatus 30 and another imaging apparatus 32 acquired, the image acquisition unit 110 transfers the image generated by the imaging apparatus 30 to the number-of-occupants count unit 122 and the image generated by another imaging apparatus 32 to the individual identification information acquisition unit 124, respectively.

As described above, the number-of-occupants count unit 122 can extract a region estimated as a person from the image generated by the imaging apparatus 30, and can compute the number of occupants of the second vehicle V2 based on the number of the regions. The individual identification information acquisition unit 124 can extract the region of the license plate from the image generated by another imaging apparatus 32 using, for example, template matching, SVM, CNN, or the like. The individual identification information acquisition unit 124 can acquire, as text data, a character string written on the license plate N of the second vehicle V2 by further using, for example, optical character recognition (OCR) technique.

The count unit 120 associates and outputs the number of occupants of the second vehicle V2 counted by the number-of-occupants count unit 122 and the individual identification information of the second vehicle V2 (for example, character string of the license plate) acquired by the individual identification information acquisition unit 124 (S108). For example, the count unit 120 can display a screen as illustrated in FIG. 8 on the display apparatus 22 connected to the information processing apparatus 20.

FIG. 8 is a diagram illustrating an example of a screen for outputting a processing result of the count unit 120. FIG. 8 illustrates a screen that displays the number of occupants of the vehicle counted by the count unit 120 together with the number of the license plate of the vehicle.

Here, when a lane in which a certain vehicle is traveling is an HOV lane or a HOT lane and the number of occupants of the vehicle is less than a prescribed number of persons, the count unit 120 may include specific additional information indicating that the number of occupants is less than the prescribed number of persons in the information on the number of occupants of the vehicle. The count unit 120 can compare, for example, information on the prescribed number of persons stored in the memory 203 in advance with the number of occupants of the vehicle counted based on the image to determine whether the number of occupants of the vehicle is equal to or greater than the prescribed number of persons. Then, the information processing apparatus 20 may be configured to give a predetermined mark M as illustrated in FIG. 8 according to the presence or absence of additional information and display information on a vehicle whose number of occupants is less than a prescribed value and information on other vehicles distinguishably from each other. In addition, the information processing apparatus 20 can display information on a vehicle whose number of occupants is less than a prescribed value and information on other vehicles distinguishably from each other by changing a character color, a background color, or the like according to the presence or absence of additional information. According to such a screen, the administrator can easily recognize the existence of a vehicle traveling on the HOV lane or the HOT lane with the number of occupants less than the prescribed number of persons. In addition, the information processing apparatus 20 may be configured to update display on the screen and output a predetermined buzzer sound when additional information is added to the count result of the number of occupants output from the count unit 120. With this configuration, it becomes easier for a person who operates the information processing apparatus 20 to notice the presence of a vehicle traveling on the HOV lane or the HOT lane with the number of occupants less than the prescribed number of persons.

Second Example Embodiment

If all the occupants of the second vehicle V2 are captured in one image, the count unit 120 can accurately count the number of occupants using the one image, but not all occupants are necessarily captured in one image. For example, when the second vehicle V2 is capture from a certain angle, there is a possibility that at least one of the occupants of the second vehicle V2 is not captured in the image due to reasons such as being out of the imaging range or being hidden by a shielding object (such as another occupant positioned in front of the occupant or an exterior portion of the vehicle). In this case, the count unit 120 cannot recognize the occupant from the image. The number-of-occupants detection system 1 of the present example embodiment may be configured as follows. Note that, except for the points described below, the number-of-occupants detection system 1 of the present example embodiment has the same configuration as that of the first example embodiment.

The imaging apparatus 30 continuously captures the second vehicle V2 from different angles according to a preset frame rate while the first vehicle passes the second vehicle V2, thereby generating a plurality of images for one second vehicle V2. By imaging the second vehicle V2 from different directions (different angles) while the first vehicle passes the second vehicle V2, the imaging range of the imaging apparatus 30 and the positional relationship between the shielding objects and the occupant of the second vehicle V2 can be changed so that each occupant of the second vehicle V2 can be captured in any of a plurality of images. Then, the image acquisition unit 110 acquires a plurality of images generated by the imaging apparatus 30. Then, the count unit 120 counts the number of occupants of the second vehicle V2 using the plurality of images acquired by the image acquisition unit 110.

As a specific example, it is assumed that, for the second vehicle V2, a total of three images of an image in which two occupants in the rear seat are captured, an image in which one of the two occupants in the rear seat and an occupant in the driver's seat is captured, and an image in which the occupants in the driver's seat and passenger's seat are acquired by the image acquisition unit 110. In this case, as disclosed in, for example, Patent Document 1, the count unit 120 can integrate the results of counting occupants using the respective images to compute the number of occupants of the second vehicle V2 as a total of four people: one in the driver's seat, one in the passenger' seat, and two in the rear seat.

As such, by using the images of the plurality of second vehicles V2, the number of occupants in the second vehicle V2 can be accurately counted.

When the plurality of images are generated by the imaging apparatus 30, the count unit 120 may be configured to select an image in which appearance of the second vehicle V2 is somewhat different from all the images and use the image for the number-of-occupants count process. For example, the count unit 120 may be configured to select, as processing target images, a plurality of images that satisfy a predetermined selection criterion from among a plurality of images acquired from the imaging apparatus 30 and count the number of occupants of the second vehicle V2 using the selected plurality of processing target images.

Specifically, the count unit 120 selects, as a processing target image, an image in which at least one specific part of the second vehicle V2 is captured in at least one predetermined region (selection reference region), among a plurality of images acquired by the image acquisition unit 110. Here, the specific part is a part that can discriminate which part of the vehicle is captured in the image, such as a pillar (front pillar, center pillar, rear pillar) or side mirror.

Figure 9:
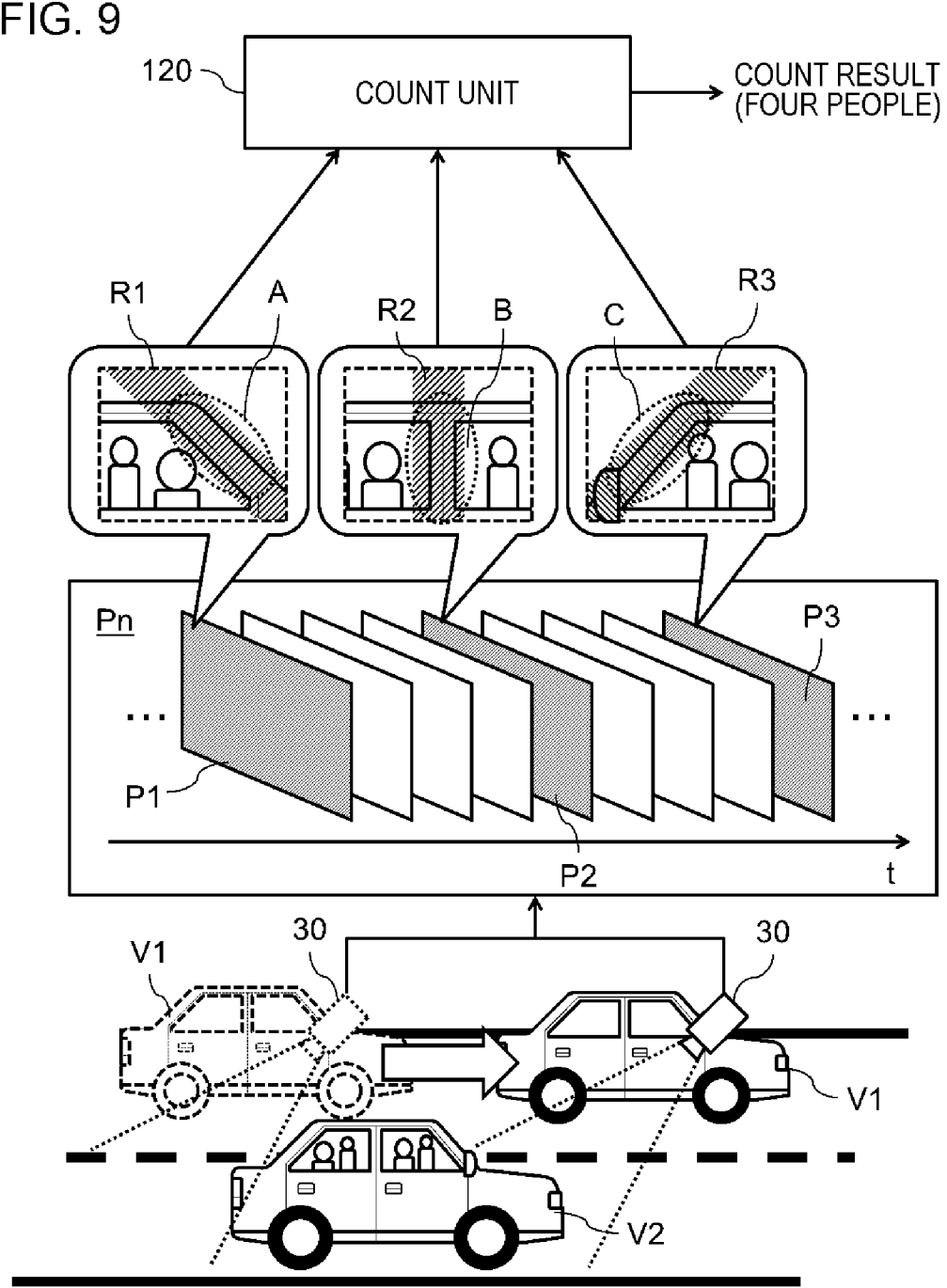
FIG. 9 is a diagram illustrating an operation in which the count unit of a vehicle selects a processing target image.

A specific operation of the count unit 120 is illustrated using FIG. 9. FIG. 9 is a diagram illustrating an operation in which the count unit 120 of the vehicle selects a processing target image. Note that, here, a case where the first vehicle V1 and the second vehicle V2 are travelling in parallel is illustrated.

First, when the first vehicle V1 overtakes the second vehicle V2, the imaging apparatus 30 captures the second vehicle V2 at a preset frame rate and generates a plurality of images Pn. When the count unit 120 acquires the plurality of images Pn via the image acquisition unit 110, the count unit 120 selects images P1, P2, and P3 in which at least one specific part (in the illustrated example, rear pillar A, center pillar B, and front pillar C) is captured in at least one predetermined selection reference region (in the illustrated example, R1, R2, and R3) determined in advance from all images Pn.

Each selection reference region is stored in a predetermined storage region such as the memory 203, as information indicating the position coordinates in the image, for example. The count unit 120 can compare the position coordinates of the selection reference region stored in the predetermined storage region with the position coordinates of the specific part recognized from the image to determine whether or not the specific part is captured in the selection reference region. Note that, the selection reference region may be determined in association with a type of a specific part of the vehicle, such as a region related to the rear pillar A and a region related to the center pillar B, for example. In the illustrated example, the selection reference regions R1, R2, and R3 are defined as regions related to the rear pillar A, the center pillar B, and the front pillar C, respectively.

FIG. 9 illustrates an example in which the count unit 120 selects a processing target image using a plurality of specific parts, but the count unit 120 may be configured to select the processing target image using one specific part (for example, only the center pillar B). In this case, the count unit 120 operates as follows, for example. Note that, here, an example in which the center pillar B is a specific part will be described. First, the count unit 120 analyzes each of the plurality of images Pn, and acquires the position coordinates of the center pillar B from each of the plurality of images Pn. Next, the count unit 120 reads the position coordinates of the plurality of selection reference regions related to the center pillar B stored in the predetermined storage region, and compares the position coordinates with each of the plurality of pieces of position information of center pillar acquired from the plurality of images Pn. The count unit 120 selects, as a processing target image, an image in which the position coordinate of the center pillar B is closest to the position coordinate of each selection reference region. As a specific example, when four selection reference regions related to the center pillar B are stored in a predetermined storage region, the count unit 120 can select four images from among a plurality of images Pn as processing target images, based on the position coordinates of the center pillar B acquired from each image.

Note that, the count unit 120 can also select a processing target image based on the positional relationship of specific parts among a plurality of images. For example, when the position coordinates of a specific part captured in a certain image and the position coordinates of the same specific part captured in another image satisfy a predetermined relationship (for example, a predetermined interval), the count unit 120 can select these images as processing target images. Here, a case where the specific part is the center pillar B will be described as a specific example. First, the count unit 120 analyzes each of the plurality of images Pn, and acquires the position coordinates of the center pillar B from each of the plurality of images Pn. Then, the count unit 120 can compare the position coordinates of the center pillar B between the plurality of images Pn to select the predetermined number of images so that the interval between the positions of the center pillars B becomes a predetermined interval.

Then, as disclosed in, for example, Patent Document 1, the count unit 120 can integrate the results of counting the occupants using the selected images P1 to P3 to compute the number of occupants of the second vehicle V2 as a total of four people: one in the driver's seat, one in the passenger's seat, and two in the rear seat.

According to such a configuration, it is possible to accurately count the number of occupants of the second vehicle V2, and reduce the number of images used in the count unit 120, thereby reducing the overall processing amount.

Note that, how the specific part of the second vehicle V2 is captured in the image varies depending on whether the second vehicle V2 is a parallel travelling vehicle or the second vehicle V2 is an oncoming vehicle. Therefore, the count unit 120 may be configured to use different selection criteria depending on whether the second vehicle V2 is a parallel travelling vehicle or an oncoming vehicle. In this case, a selection criterion suitable when the second vehicle V2 is a parallel travelling vehicle and a selection criterion suitable when the second vehicle V2 is an oncoming vehicle are prepared in advance in the memory 203 or the like.

As one of methods for identifying whether the second vehicle V2 is a parallel travelling vehicle or an oncoming vehicle, for example, it is conceivable to provide the first vehicle V1 with a switch for selecting which of the parallel travelling vehicle and the oncoming vehicle is to be captured. In this case, the imaging apparatus 30 may have a mechanism that automatically adjusts the orientation and angle of view of the imaging apparatus 30 in conjunction with selection state of the switch. The count unit 120 further acquires information indicating the selection state of the switch from the first vehicle V1, and identifies whether the second vehicle V2 in the image is the parallel travelling vehicle or the oncoming vehicle based on the information.

In a case where a first imaging apparatus used when the second vehicle V2 captures a parallel travelling vehicle and a second imaging apparatus used when the second vehicle V2 captures an oncoming vehicle are mounted on the first vehicle V1, the count unit 120 can identify whether the second vehicle V2 in the image is a parallel travelling vehicle or an oncoming vehicle, based on whether the imaging apparatus that provided the image to be processed is the first imaging apparatus or the second imaging apparatus.

As another method, for example, the magnitude of the relative velocity between the first vehicle V1 and the second vehicle V2 can be used. Specifically, if the second vehicle V2 is a parallel travelling vehicle, the first vehicle V1 and the second vehicle V2 are moving in the same direction, and thus the relative velocity is not so high. On the other hand, if the second vehicle V2 is an oncoming vehicle, the first vehicle and the second vehicle V2 are moving in opposite directions, and thus the relative velocity is higher than when the second vehicle V2 is the parallel travelling vehicle. In this case, for example, the count unit 120 can compute a change in the distance per unit time between the first vehicle V1 and the second vehicle V2 based on the output signal of the vehicle detection sensor 40, and can compute the relative velocity between the first vehicle V1 and the second vehicle V2 based on the change in the distance per unit time. Then, the count unit 120 identify whether the second vehicle V2 in the image is a parallel travelling vehicle or an oncoming vehicle, depending on whether or not the relative velocity between the first vehicle V1 and the second vehicle V2 exceeds a threshold value (for example, 40 km/h) stored in advance in the memory 203 or the like.

Third Example Embodiment

The relative velocities of the first vehicle V1 and the second vehicle V2 are greatly different between when the second vehicle V2 is a parallel travelling vehicles and when the second vehicle V2 is an oncoming vehicle. That is, it can be said that the setting of the imaging apparatus 30 for generating an image in which the second vehicle V2 and its occupant are clearly visible is different between when the second vehicle V2 is a parallel travelling vehicle and when the second vehicle V2 is an oncoming vehicle. The number-of-occupants detection system 1 according to this example embodiment has a configuration in which the setting (for example, a frame rate, a shutter speed, an amount of light from the projector 50, and the like) at the time of imaging by the imaging apparatus 30 is different between when the second vehicle V2 is a parallel travelling vehicle and when the second vehicle V2 is an oncoming vehicle.

Specifically, the relative velocity between the first vehicle V1 and the second vehicle V2 is greater when the second vehicle V2 is the oncoming vehicle than when the second vehicle V2 is the parallel travelling vehicle. Therefore, when the second vehicle V2 is the oncoming vehicle, the imaging apparatus 30 preferably captures the second vehicle V2 at a high frame rate and a high shutter speed in order to capture a subject clearly. In this case, it is preferable to increase an amount of light emitted from the projector 50 in accordance with the shutter speed. On the other hand, when the second vehicle V2 is a parallel travelling vehicle, the relative velocity between the first vehicle V1 and the second vehicle V2 is relatively small, and thus a clear image can be generated to some extent even with a slow shutter speed. When the shutter speed is slow, a clear image can be generated to some extent even if the amount of light emitted from the projector 50 is not large. When the relative velocity between the first vehicle V1 and the second vehicle V2 is small, if the second vehicle V2 is captured at a high frame rate, many images that are not used for counting the number of occupants, with little change in the state of the subject, are acquired. Thus, it is preferable that the imaging apparatus 30 captures the second vehicle V2 at a lower frame rate than when the second vehicle V2 is an oncoming vehicle.

[Function Configuration]

Figure 10:
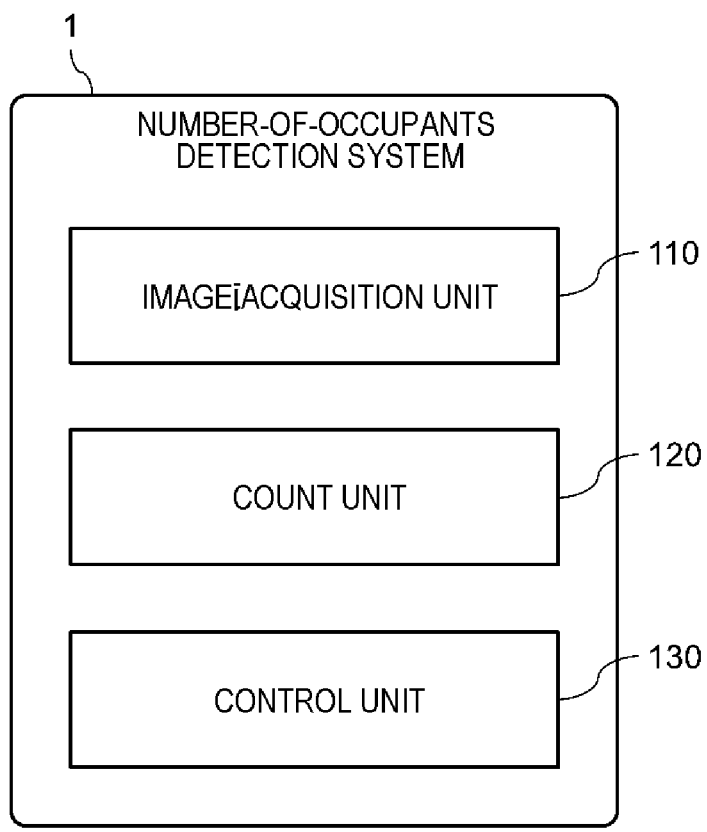
FIG. 10 is a block diagram conceptually illustrating a functional configuration of a number-of-occupants detection system of a third example embodiment.

FIG. 10 is a block diagram conceptually illustrating a functional configuration of the number-of-occupants detection system 1 of the third example embodiment. Note that, although FIG. 10 is based on the configuration of the first example embodiment, but may further include the configuration described in the other example embodiments. As illustrated in FIG. 10, the number-of-occupants detection system 1 according to this example embodiment is configured to include a control unit 130.

The control unit 130 receives information indicating which of the parallel travelling vehicle and the oncoming vehicle is to be captured by using the imaging apparatus 30, and changes the setting at the time of imaging of the imaging apparatus 30 based on the received information. For example, when the switch for selecting which of the parallel travelling vehicle and the oncoming vehicle is to be captured is provided in the first vehicle V1, the control unit 130 acquires information indicating the selection state of the switch from the first vehicle V1. Then, for example, the control unit 130 refers to a table as illustrated in FIG. 11 and reads setting information of the imaging apparatus 30 corresponding to the selection state of the switch. FIG. 11 is a diagram illustrating an example of a configuration for storing setting information of the imaging apparatus 30. In the example of FIG. 11, the setting information of the imaging apparatus 30 is stored in association with the selection information of the switch. The control unit 130 generates a control instruction for changing the setting at the time of imaging of the imaging apparatus 30 based on the read setting information, and transmits the control instruction to the imaging apparatus 30. The imaging apparatus 30 changes the setting at the time of imaging in response to the control instruction from the control unit 130.

When the first imaging apparatus used for imaging the parallel travelling vehicle and the second imaging apparatus used for imaging the oncoming vehicle are respectively provided, the control unit 130 may not be provided. In this case, the first imaging apparatus is preset so as to capture images with a low frame rate, a low shutter speed, and a normal amount of light projection, and the second imaging apparatus is preset so as to capture images with a high frame rate, a high shutter speed, and a large amount of light projection.

According to the configuration of this example embodiment, an image suitable for the count processing of the count unit 120 can be generated by adopting settings suitable for imaging a vehicle travelling in parallel and imaging an oncoming vehicle.

Fourth Example Embodiment

The imaging apparatus 30 is mounted on the first vehicle V1. Therefore, the positional relationship between the imaging apparatus 30 mounted on the first vehicle V1 and the second vehicle V2 may change. In this case, the second vehicle V2 or the occupant of the second vehicle V2 is positioned outside the depth of field of the imaging apparatus 30, and the subject captured in the image may be blurred. Also, so-called motion blur is likely to occur due to vibration transmitted from the first vehicle V1, a difference in velocity between the first vehicle V1 and the second vehicle V2, and the like. The number-of-occupants detection system 1 of this example embodiment further includes a configuration for reducing blurring of the subject with respect to the image generated by the imaging apparatus 30, in addition to the configuration of each example the embodiment described above.

[Functional Configuration]

Figure 12:
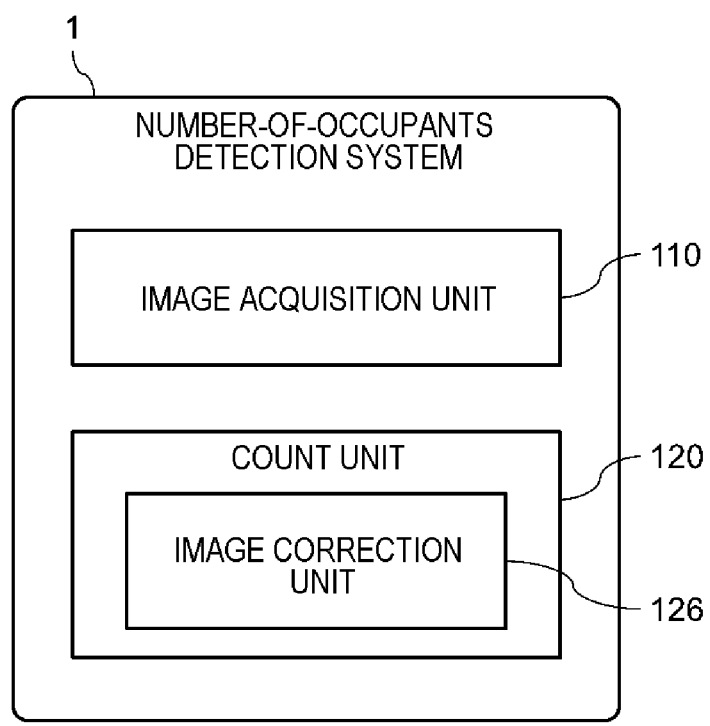
FIG. 12 is a block diagram conceptually illustrating a functional configuration of a number-of-occupants detection system of a fourth example embodiment.

FIG. 12 is a block diagram conceptually illustrating a functional configuration of the number-of-occupants detection system 1 of a fourth example embodiment. Note that, although FIG. 12 is based on the configuration of the first example embodiment, the configuration described in other example embodiments may be further included. As illustrated in FIG. 12, in the number-of-occupants detection system 1 of this example embodiment, the count unit 120 is configured to include an image correction unit 126.

The image correction unit 126 executes correction processing for reducing blurring of the subject (that is, the second vehicle V2) in the image acquired by the image acquisition unit 110 based on at least one of the distance from the first vehicle V1 to the second vehicle V2 and the relative velocity between the first vehicle V1 and the second vehicle V2. This correction processing includes processing for reducing blurring caused by the depth of field of the imaging apparatus 30 and so-called motion blur. The image correction unit 126 can recognize the distance from the first vehicle V1 to the second vehicle V2 based on, for example, the output signal of the vehicle detection sensor 40 mounted on the first vehicle V1. The image correction unit 126 can determine a parameter for correcting blurring of the subject caused by the depth of field of the imaging apparatus 30 according to the distance from the first vehicle V1 to the second vehicle V2. For example, the image correction unit 126 can determine a parameter according to the distance from the first vehicle V1 to the second vehicle V2 using a function that computes a parameter based on the distance as an argument, a table that stores corresponding a parameter defined for each distance, and the like. The image correction unit 126 can compute a relative velocity between the first vehicle V1 and the second vehicle V2 based on the change over time of the distance from the first vehicle V1 to the second vehicle V2 and can determine a parameter for correcting motion blur of the subject according to the relative velocity. For example, the image correction unit 126 can determine a parameter according to the relative velocity between the first vehicle V1 and the second vehicle V2 using a function for computing a parameter with the relative velocity as an argument, a table that stores a corresponding parameter defined for each relative velocity, and the like. The image correction unit 126 performs the correction processing on the image acquired by the image acquisition unit 110 using the parameters determined in this way.

The image correction unit 126 can also determine the blurred degree of an image by analyzing the image acquired by the image acquisition unit 110 and determine a parameter according to the blurred degree of the image. For example, the image correction unit 126 can acquire information on a spatial frequency of the image by analysis, and determine a correction parameter based on the information. Although not particularly limited, for example, when a blurring function representing a blurring property of an image such as a point spread function is known, the image correction unit 126 can derive a Wiener filter for blurring reduction as shown in the following equation by decomposing the blurring function of the image into spatial frequency components by Fourier transform.

$$W = \frac{H^*}{|H|^2 + \Gamma}$$ [Formula 1]

Note that, in the above formula, H indicates the Fourier transform of the blurring function of the image, H* indicates the complex conjugate of the Fourier transform H, and Γ indicates a constant to be determined by the SN (Signal to Noise) ratio of the image signal. Note that, the above formula is stored in a predetermined storage region such as the memory 203 or the storage device 204, and the image correction unit 126 can read the formula from the storage region and determine a correction parameter for reducing blur.

In addition, the image correction unit 126 can acquire information indicating blur of the subject computed using an autocorrelation function as information indicating the blurred degree of the image, and determine a correction parameter for reducing blur. In this case, the image correction unit 126 can determine a correction parameter using a predetermined function for deriving a parameter for canceling blur by substituting a blur direction and blur amount of an object in the image that can be computed using the autocorrelation function. Note that, the function described above is stored in a predetermined storage region such as the memory 203 or the storage device 204, and the image correction unit 126 can read the function from the storage region and determine the parameter.

[Hardware Configuration]

A hardware configuration of this example embodiment is the same as that of the first example embodiment (example: FIGS. 2 and 4). In this example embodiment, the storage device 204 of the information processing apparatus 20 further stores a program module that implements the function of the image correction unit 126 described above. The function of the image correction unit 126 described above is implemented by the processor 202 of the information processing apparatus 20 executing this program module.

As mentioned above, in this example embodiment, the processing which reduces blurring of an image is executed according to the distance between vehicles. With this configuration, the number of occupants can be accurately counted using an image in which the subject (the second vehicle and the occupants of the second vehicle) is clearly captured.

Fifth Example Embodiment

In a road having multiple lanes, when some lanes are set as HOV lanes or HOT lanes, the first vehicle V1 can perform surveillance work efficiently by travelling in the vicinity of the lane targeted for surveillance. The number-of-occupants detection system 1 of this example embodiment further includes a configuration for guiding the first vehicle V1 in the vicinity of a target lane (for example, HOV lane or HOT lane) for surveillance work.

[Function Configuration]

Figure 13:
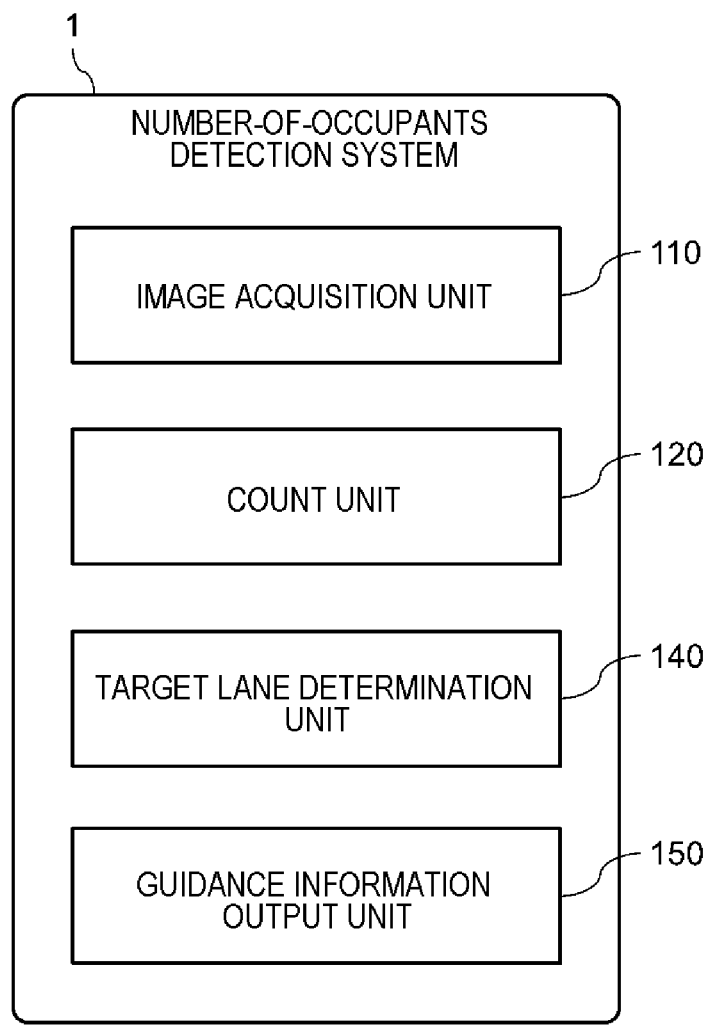
FIG. 13 is a block diagram conceptually illustrating a functional configuration of a number-of-occupants detection system of a fifth example embodiment.

FIG. 13 is a block diagram conceptually illustrating a functional configuration of the number-of-occupants detection system 1 of a fifth example embodiment. Note that, although FIG. 13 is based on the configuration of the first example embodiment, the configuration described in other example embodiments may be further included. As illustrated in FIG. 13, the number-of-occupants detection system 1 of this example embodiment is configured to include a target lane determination unit 140 and a guidance information output unit 150.

The target lane determination unit 140 determines the target lane in which the vehicle targeted for the number-of-occupants count processing travels, for example, as follows. First, the target lane determination unit 140 acquires the current position information of the first vehicle V1 using, for example, global positioning system (GPS) (not illustrated). Then, the target lane determination unit 140 retrieves map information prepared in the memory 203, the storage device 204, and the like using the acquired current position information of the first vehicle V1. The map information includes the position information of the surveillance target lane, and the target lane determination unit 140 determines a target lane near the current position of the first vehicle V1 based on the current position information of the first vehicle V1.

The guidance information output unit 150 outputs information (hereinafter referred to as "guidance information") for guiding the first vehicle V1 to a lane (for example, an adjacent lane) in the vicinity of the target lane determined by the target lane determination unit 140. The guidance information output unit 150 can output, for example, information for causing a car navigation apparatus (not illustrated) to display a screen that highlights a lane on which the first vehicle V1 should travel as guidance information. The guidance information output unit 150 can output, for example, information for displaying a message (for example, "Please drive in the center lane") indicating a lane on which the first vehicle V1 should travel on a car navigation apparatus (not illustrated) or outputting the message from an in-vehicle speaker (not illustrated) as guidance information. The person driving the first vehicle V1 can drive the first vehicle V1 based on the guidance information output from the car navigation apparatus or the speaker apparatus, and move the first vehicle V1 to a lane adjacent to the target lane. The guidance information output unit 150 can output information for controlling an operation during the automatic driving so as to cause the first vehicle V1 to travel in the lane adjacent to the target lane to a control unit (for example, electronic control unit (ECU) (not illustrated) that controls the automatic driving of the first vehicle V1. The ECU controls the operation of the first vehicle V1 based on the guidance information from the guidance information output unit 150, whereby the first vehicle V1 can be guided to the lane adjacent to the target lane.

[Hardware Configuration]

The hardware configuration of this example embodiment is the same as that of the first example embodiment (example: FIGS. 2 and 4). In this example embodiment, the storage device 204 of the information processing apparatus 20 further stores program modules that implement the functions of the target lane determination unit 140 and the guidance information output unit 150 described above. The functions of the target lane determination unit 140 and the guidance information output unit 150 described above are implemented by the processor 202 of the information processing apparatus 20 executing these program modules.

As described above, according to this example embodiment, the first vehicle V1 can be guided to a preferable lane in order to perform surveillance work. With this configuration, efficiency of the surveillance work by the first vehicle V1 can be improved.

Sixth Example Embodiment

The number-of-occupants detection system 1 of this example embodiment has the same functional configuration as that of the example embodiments described above except for the following points.

[Functional Configuration]

Figure 14:
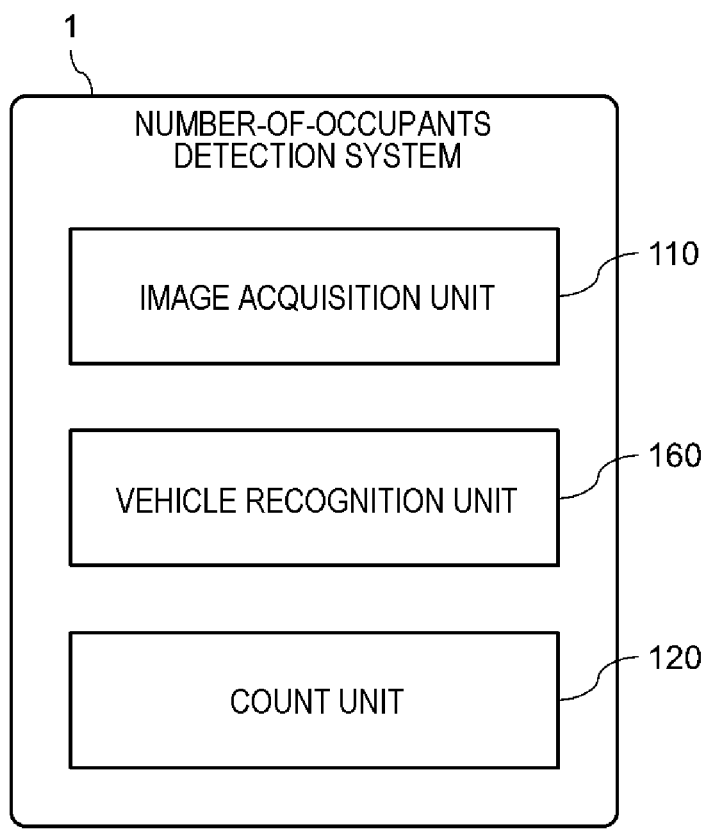
FIG. 14 is a block diagram conceptually illustrating a functional configuration of a number-of-occupants detection system of a sixth example embodiment.

FIG. 14 is a block diagram conceptually illustrating a functional configuration of the number-of-occupants detection system 1 of a sixth example embodiment. Note that, although FIG. 14 is based on the configuration of the first example embodiment, the configuration described in other example embodiments may be further included. As illustrated in FIG. 14, the number-of-occupants detection system 1 of this example embodiment is configured to further include a vehicle recognition unit 160. In the number-of-occupants detection system 1 of this example embodiment, the imaging apparatus 30 constantly repeats imaging, for example, like a surveillance camera, and the vehicle recognition unit 160 determines whether or not a vehicle exists in the image captured by the imaging apparatus 30 using known object recognition algorithm. When the vehicle is recognized in the image captured by the imaging apparatus 30, the vehicle recognition unit 160 instructs the count unit 120 to execute processing of counting the number of occupants using the image. In response to an instruction from the vehicle recognition unit 160, the count unit 120 executes the processing of counting the number of occupants using the image as described above.

[Hardware Configuration]

A hardware configuration of this example embodiment is substantially the same as that of the first example embodiment (for example, FIGS. 2 and 4). Note that, in this example embodiment, since the imaging apparatus 30 constantly repeats imaging, the vehicle detection sensor 40 that generates a trigger for the imaging operation of the imaging apparatus 30 is not necessary. A program module for implementing the function of the vehicle recognition unit 160 is further stored. The function of the vehicle recognition unit 160 described above is implemented by the processor 202 of the information processing apparatus 20 executing the program module.

Operation Example

A flow of processing in the number-of-occupants detection system 1 of the sixth example embodiment will be described with reference to FIG. 15. FIG. 15 is a flowchart illustrating the flow of the processing in the number-of-occupants detection system 1 of the sixth example embodiment.

The image acquisition unit 110 acquires an image from the imaging apparatus 30 that constantly performs imaging (S202), and the vehicle recognition unit 160 analyzes whether or not an object recognized as a vehicle is included in the image acquired by the image acquisition unit 110 (S204). When it is determined that the vehicle is recognized in the image as a result of analyzing the image (YES in S206), the vehicle recognition unit 160 instructs the count unit 120 to execute the number-of-occupants count processing using the image acquired by the image acquisition unit 110 (S208). In response to an instruction from the vehicle recognition unit 160, the count unit 120 executes processing of counting the number of occupants as described in the example embodiments described above. On the other hand, when it is determined that the vehicle is not recognized in the image as a result of analyzing the image (NO in S206), the processing described above is skipped, and the processing target moves to the next image newly acquired by the image acquisition unit 110.

As described above, although the example embodiments of the present invention have been described with reference to the drawings, these example embodiments are exemplifications of the present invention, and various configurations other than those described above can be adopted.

In the plurality of flowcharts used in the description described above, a plurality of steps (processes) are described in order, but the execution order of the steps executed in each example embodiment is not limited to the description order. In each example embodiment, the order of the illustrated steps can be changed within a range that does not hinder the contents. Each example embodiment described above can be combined in a range in which the contents do not conflict.

A part or whole of the example embodiments described above may be described as in the following appendices, but are not limited to the following appendices.

1.

A number-of-occupants detection system including:

an image acquisition unit that acquires, from an imaging apparatus mounted on a first vehicle, an image of a second vehicle existing around the first vehicle; and a count unit counts the number of occupants of the second vehicle using the image acquired by the image acquisition unit.

2.

The number-of-occupants detection system according to 1, in which the image acquisition unit acquires a plurality of images obtained by imaging the second vehicle from different directions, and the count unit counts the number of occupants of the second vehicle using the plurality of images.

3.

The number-of-occupants detection system according to 2, in which the count unit selects a plurality of processing target images that satisfy a predetermined selection criterion from the plurality of images, and counts the number of occupants of the second vehicle using the plurality of processing target images.

4.

The number-of-occupants detection system according to 3, in which the count unit selects the plurality of processing target images from the plurality of images so that a specific part of the second vehicle captured in one processing target image and a specific part of the second vehicle captured in another processing target image satisfy a predetermined positional relationship.

5.

The number-of-occupants detection system according to 3 or 4, in which the count unit selects, as the processing target image, an image in which at least one specific part of the second vehicle is captured in at least one predetermined selection reference region, among the plurality of images.

6.

The number-of-occupants detection system according to any one of 3 to 5, in which the selection criterion is different between when the second vehicle is a parallel travelling vehicle and when the second vehicle is an oncoming vehicle.

7.

The number-of-occupants detection system according to any one of 1 to 6, in which a setting at the time of imaging by the imaging apparatus is different between when the second vehicle is a parallel travelling vehicle and when the second vehicle is an oncoming vehicle.

8.

The number-of-occupants detection system according to any one of 1 to 7, in which the image acquisition unit and the count unit are provided in the first vehicle.

9.

The number-of-occupants detection system according to any one of 1 to 8, in which the first vehicle is further provided with a distance measurement unit measures a distance to the second vehicle, and the count unit executes correction processing for reducing blurring of a subject of the image, based on at least one of the distance to the second vehicle measured by the distance measurement unit and a relative velocity between the first vehicle and the second vehicle computed using a change in the distance.

10.

The number-of-occupants detection system according to 9, in which the correction processing includes processing of reducing blurring based on a depth of field of the imaging apparatus or a motion blur of the subject.

11.

The number-of-occupants detection system according to any one of 1 to 10, in which the first vehicle is mounted with a first imaging apparatus used when the second vehicle is a parallel travelling vehicle and a second imaging apparatus used when the second vehicle is an oncoming vehicle, and an imaging direction of the second imaging apparatus is directed closer to an advancing direction of the first vehicle than the imaging direction of the first imaging apparatus.

12.

The number-of-occupants detection system according to any one of 1 to 11, in which the image acquisition unit further acquires another image including individual identification information of the second vehicle, and the count unit acquires the individual identification information of the second vehicle from the another image, and outputs the individual identification information in association with the counted number of occupants of the second vehicle.

13.

The number-of-occupants detection system according to 12, in which the first vehicle is further mounted with another imaging apparatus for imaging the another image.

14.

The number-of-occupants detection system according to any one of 1 to 13, further including:

a target lane determination unit that determines a target lane on which a vehicle to be subjected to number-of-occupants count processing travels, based on position information of the first vehicle; and a guidance information output unit that outputs guidance information for guiding the first vehicle to a lane adjacent to the target lane determined by the target lane determination unit.

15.

A number-of-occupants detection method implemented by a computer including:

acquiring, from an imaging apparatus mounted on a first vehicle, an image of a second vehicle existing around the first vehicle; and counting the number of occupants of the second vehicle using the acquired image.

16.

The number-of-occupants detection method according to 15, further including:

acquiring a plurality of images obtained by imaging the second vehicle from different directions; and counting the number of occupants of the second vehicle using the plurality of images.

17.

The number-of-occupants detection method according to 16, further including:

selecting a plurality of processing target images that satisfy a predetermined selection criterion from the plurality of images; and counting the number of occupants of the second vehicle using the plurality of processing target images.

18.

The number-of-occupants detection method according to 17, further including:

selecting the plurality of processing target images from the plurality of images so that a specific part of the second vehicle captured in one processing target image and a specific part of the second vehicle captured in another processing target image satisfy a predetermined positional relationship.

19.

The number-of-occupants detection method according to 17 or 18, further including:

selecting, as the processing target image, an image in which at least one specific part of the second vehicle is captured in at least one predetermined selection reference region, among the plurality of images.

20.

The number-of-occupants detection method according to any one of 17 to 19, in which the selection criterion is different between when the second vehicle is a parallel travelling vehicle and when the second vehicle is an oncoming vehicle.

21.

The number-of-occupants detection method according to any one of 15 to 20, in which a setting at the time of imaging by the imaging apparatus is different between when the second vehicle is a parallel travelling vehicle and when the second vehicle is an oncoming vehicle.

22.

The number-of-occupants detection method according to any one of 15 to 21, in which the computer is provided in the first vehicle.

23.

The number-of-occupants detection method according to any one of 15 to 22, in which the first vehicle is further provided with a distance measurement unit that measures a distance to the second vehicle, and the method further including:

executing correction processing for reducing blurring of a subject of the image, based on at least one of the distance to the second vehicle measured by the distance measurement unit and a relative velocity between the first vehicle and the second vehicle computed using change in the distance.

24.

The number-of-occupants detection method according to 23, in which the correction processing includes processing of reducing blurring based on a depth of field of the imaging apparatus or a motion blur of the subject.

25.

The number-of-occupants detection method according to any one of 15 to 24, in which the first vehicle is mounted with a first imaging apparatus used when the second vehicle is a parallel travelling vehicle and a second imaging apparatus used when the second vehicle is an oncoming vehicle, and an imaging direction of the second imaging apparatus is directed closer to an advancing direction of the first vehicle than the imaging direction of the first imaging apparatus.

26.

The number-of-occupants detection method according to any one of 15 to 25, further including:

further acquiring another image including individual identification information of the second vehicle; and acquiring the individual identification information of the second vehicle from the another image, and outputting the individual identification information in association with the counted number of occupants of the second vehicle.

27.

The number-of-occupants detection method according to 26, in which the first vehicle is further mounted with another imaging apparatus for imaging the another image.

28.

The number-of-occupants detection method according to any one of 15 to 27, further including:

determining a target lane on which a vehicle to be subjected to number-of-occupants count processing travels, based on position information of the first vehicle; and outputting guidance information for guiding the first vehicle to a lane adjacent to the determined target lane.

29.

A program for causing a computer to execute the number-of-occupants detection method according to any one of 15 to 28.

The invention claimed is:

1. A number-of-occupants detection system comprising:
a processor; and
a memory storing executable instructions that, when executed by the processor, causes the processor to perform as:
an image acquisition unit that acquires, from an imaging apparatus mounted on a first vehicle, an image of a second vehicle existing around the first vehicle;
a count unit that counts the number of occupants of the second vehicle using the image acquired by the image acquisition unit;
a target lane determination unit that determines a target lane on which a vehicle to be subjected to number-of-occupants count processing travels, based on position information of the first vehicle, and
a guidance information output unit that outputs guidance information for guiding the first vehicle to a lane adjacent to the target lane determined by the target lane determination unit.

2. The number-of-occupants detection system according to claim 1,
wherein the image acquisition unit acquires a plurality of images obtained by imaging the second vehicle from different directions, and
the count unit counts the number of occupants of the second vehicle using the plurality of images.

3. The number-of-occupants detection system according to claim 2,
wherein the count unit
selects a plurality of processing target images that satisfy a predetermined selection criterion from the plurality of images, and
counts the number of occupants of the second vehicle using the plurality of processing target images.

4. The number-of-occupants detection system according to claim 3, wherein the count unit selects the plurality of processing target images from the plurality of images so that a specific part of the second vehicle captured in one processing target image and a specific part of the second vehicle captured in another processing target image satisfy a predetermined positional relationship.

5. The number-of-occupants detection system according to claim 3,
wherein the count unit selects, as the processing target image, an image in which at least one specific part of the second vehicle is captured in at least one predetermined selection reference region, among the plurality of images.

6. The number-of-occupants detection system according to claim 3,
wherein the selection criterion is different between when the second vehicle is a parallel travelling vehicle and when the second vehicle is an oncoming vehicle.

7. The number-of-occupants detection system according to claim 1,
wherein a setting at the time of imaging by the imaging apparatus is different between when the second vehicle is a parallel travelling vehicle and when the second vehicle is an oncoming vehicle.

8. The number-of-occupants detection system according to claim 1,
wherein the image acquisition unit and the count unit are provided in the first vehicle.

9. The number-of-occupants detection system according to claim 1,
wherein the first vehicle is further provided with a distance measurement unit that measures a distance to the second vehicle, and
the count unit executes correction processing for reducing blurring of a subject of the image, based on at least one of the distance to the second vehicle measured by the distance measurement unit and a relative velocity between the first vehicle and the second vehicle computed using a change in the distance.

10. The number-of-occupants detection system according to claim 9,
wherein the correction processing includes processing of reducing blurring based on a depth of field of the imaging apparatus or a motion blur of the subject.

11. The number-of-occupants detection system according to claim 1,
wherein the first vehicle is mounted with a first imaging apparatus used when the second vehicle is a parallel travelling vehicle and a second imaging apparatus used when the second vehicle is an oncoming vehicle, and
an imaging direction of the second imaging apparatus is directed closer to an advancing direction of the first vehicle than an imaging direction of the first imaging apparatus.

12. The number-of-occupants detection system according to claim 1,
wherein the image acquisition unit further acquires another image including individual identification information of the second vehicle, and
the count unit acquires the individual identification information of the second vehicle from the another image, and outputs the individual identification information in association with the counted number of occupants of the second vehicle.

13. The number-of-occupants detection system according to claim 12,
wherein the first vehicle is further mounted with another imaging apparatus for imaging the another image.

14. A number-of-occupants detection method implemented by a computer comprising:
acquiring, from an imaging apparatus mounted on a first vehicle, an image of a second vehicle existing around the first vehicle;
counting the number of occupants of the second vehicle using the acquired image;
determining a target lane on which a vehicle to be subjected to number-of-occupants count processing travels, based on position information of the first vehicle, and
outputting guidance information for guiding the first vehicle to a lane adjacent to the determined target lane.

15. A non-transitory computer readable medium storing a program for causing a computer to execute a number-of-occupants detection method, the method comprising:
acquiring, from an imaging apparatus mounted on a first vehicle, an image of a second vehicle existing around the first vehicle;
counting the number of occupants of the second vehicle using the acquired image;
determining a target lane on which a vehicle to be subjected to number-of-occupants count processing travels, based on position information of the first vehicle, and
outputting guidance information for guiding the first vehicle to a lane adjacent to the determined target lane.

* * * * *